(12) United States Patent
Jones

(10) Patent No.: US 6,430,284 B1
(45) Date of Patent: *Aug. 6, 2002

(54) SYSTEM AND METHOD FOR REDIRECTING CONTROL OF IN-BAND SIGNALING

(75) Inventor: Beverly M. Jones, Piscataway, NJ (US)

(73) Assignee: AT&T Corp., New York, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 09/709,655

(22) Filed: Nov. 13, 2000

Related U.S. Application Data

(63) Continuation of application No. 08/586,021, filed on Dec. 29, 1995, now Pat. No. 6,314,175.

(51) Int. Cl.$^7$ .......................... H04M 3/42; H04M 11/00
(52) U.S. Cl. .................... 379/229; 379/93.26; 379/228; 379/283
(58) Field of Search .................. 379/67.1, 88.01, 379/88.28, 93.01, 93.26, 115.01, 201.01, 202.01, 207.02, 210.01, 211.02, 212.01, 219, 220.01, 221.01, 223, 224, 228, 229, 230, 231, 282, 283

(56) References Cited

U.S. PATENT DOCUMENTS

| | | | |
|---|---|---|---|
| 4,544,804 A | | 10/1985 | Herr et al. .................. 379/204 |
| 4,837,799 A | | 6/1989 | Prohs et al. ................. 379/224 |
| 4,907,260 A | | 3/1990 | Prohs et al. ................. 379/224 |
| 5,193,110 A | * | 3/1993 | Jones et al. ................... 379/89 |
| 5,199,062 A | * | 3/1993 | Von Meister et al. ......... 379/89 |
| 5,239,676 A | | 8/1993 | Strawczynski et al. ..... 455/33.2 |
| 5,267,305 A | | 11/1993 | Prohs et al. ................. 379/233 |
| 5,276,731 A | * | 1/1994 | Arbel et al. ................. 379/201 |
| 5,309,512 A | * | 5/1994 | Blackmon et al. .......... 379/211 |
| 5,329,578 A | * | 7/1994 | Brennan et al. ....... 379/211.03 |
| 5,390,179 A | | 2/1995 | Killian et al. ............... 370/68.1 |
| 5,432,845 A | * | 7/1995 | Burd et al. ............. 379/211.01 |
| 5,479,491 A | * | 12/1995 | Garcia et al. ................ 379/211 |
| 5,511,111 A | * | 4/1996 | Serbetcioglu et al. ........ 379/211 |
| 5,566,236 A | * | 10/1996 | MeLampy et al. .......... 379/207 |
| 5,572,582 A | * | 11/1996 | Riddle ......................... 379/229 |
| 5,590,186 A | * | 12/1996 | Liao et al. ................... 379/229 |
| 5,627,875 A | * | 5/1997 | Kapsales ................ 379/207.08 |
| 5,862,208 A | * | 1/1999 | MeLampy et al. .......... 379/212 |

FOREIGN PATENT DOCUMENTS

| | | | |
|---|---|---|---|
| EP | 0 485 980 A2 | 11/1991 | ............ H04M/3/54 |
| EP | 0 604 042 A1 | 3/1993 | ............ H04M/3/58 |

OTHER PUBLICATIONS

European Search Report re 96120789.1–2209.

* cited by examiner

*Primary Examiner*—Harry S. Hong
(74) *Attorney, Agent, or Firm*—Kenyon & Kenyon

(57) ABSTRACT

In a telecommunication system having a network switch capable of independently controlling inbound and outbound call legs, a system for, and method of, redirecting in-band control of signaling pertaining to a call placed by a calling party and a system for providing automatic call completion from the calling party to a called party. The control redirecting system includes: (1) call control circuitry, associated with the network switch, for routing the call from the calling party to another party through the network switch, the call thereby having an inbound leg from the calling party to the network switch and an outbound leg from the network switch to the other party and (2) call control redirection circuitry for treating the outbound leg of the call as a second inbound leg from the other party to the network switch and monitoring in-band control signals received from the other party via the second inbound leg. The call control redirection circuitry thereby allows the other party to issue the in-band control signals to the call control circuitry.

21 Claims, 4 Drawing Sheets

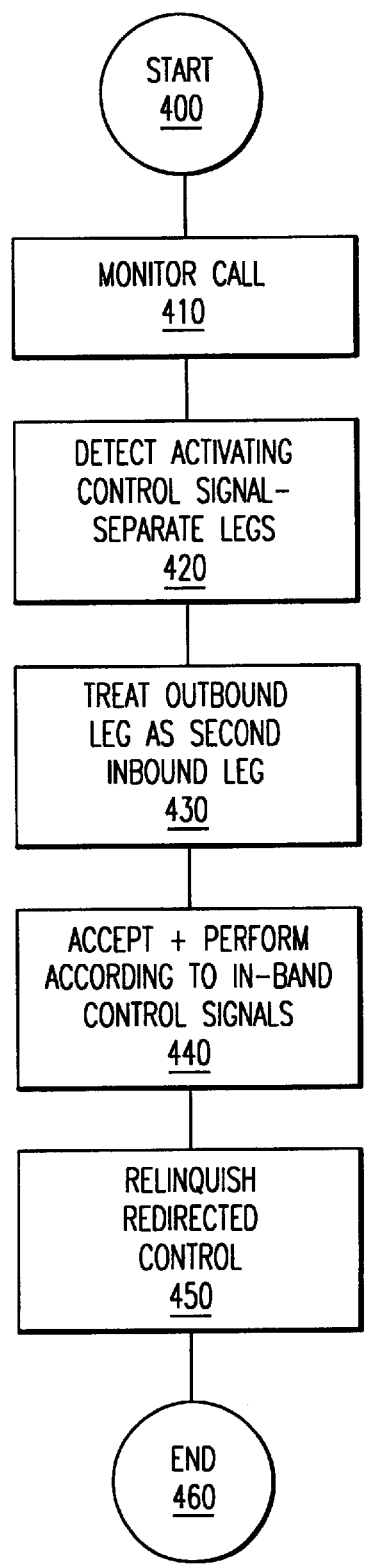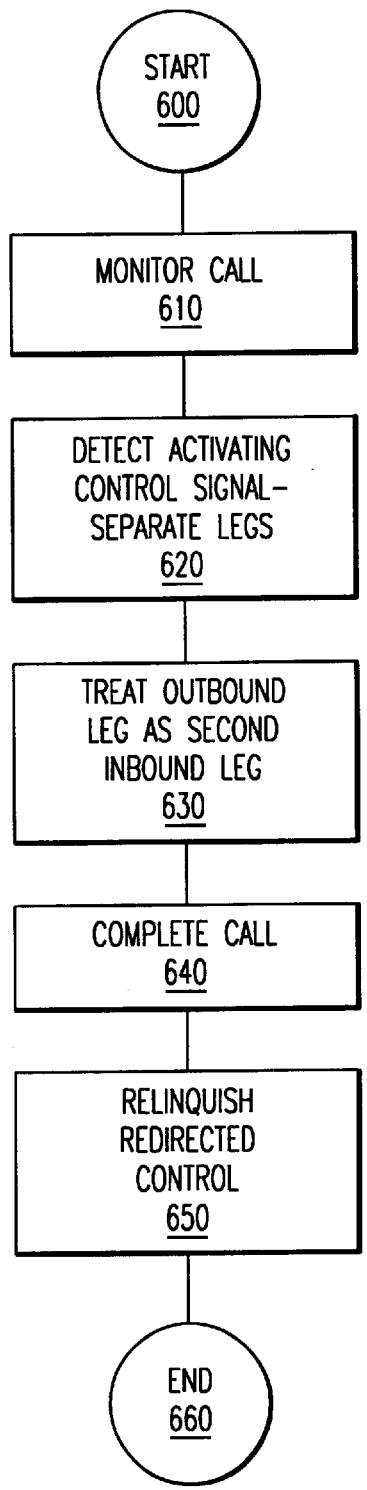
FIG.4                                   FIG.6

SYSTEM AND METHOD FOR REDIRECTING CONTROL OF IN-BAND SIGNALING

This application is a continuation of U.S. patent application Ser. No. 08/586,021 filed on Dec. 29, 1995 now U.S. Pat. No. 6,314,175 B1, which is hereby incorporated by reference in its entirety.

TECHNICAL FIELD OF THE INVENTION

The present invention is directed, in general, to telecommunication systems and, more specifically, to a system and method for redirecting control of in-band signaling functions from the calling party to a party other than the calling party.

BACKGROUND OF THE INVENTION

For years, the party placing a telephone call (the "calling party") has been primarily responsible for initiating the pulses, tones or other signaling codes that cause telephone network equipment, such as switches, to route the calling party's call through a telephone network to a desired destination. In other words, signaling control has rested in the hands of the calling party. To date, the only exception to this rule has been a telephone operator (or, synonymously, "attendant"), who has been allowed to exert unique signaling control over the calling party's call by virtue of special signaling connections between the attendant and the telephone equipment.

It is best to convey this traditional relationship by way of example. A calling party wishing to place a call must first take a telephone instrument off-hook. The calling party must then dial or press digits corresponding to the destination number ("DTN") desired, thereby causing the telephone instrument to generate pulses or tones ("control signals")to direct the telephone equipment to place the call through the network. If any further digits are required to complete the call, the calling party has been responsible for supplying the digits when prompted.

If the calling party does not know the DTN (and therefore requires directory assistance) or needs other help (such as conferencing or international access), the calling party has been required to call the telephone operator to employ the operator's assistance to find the DTN or complete the call. Again, the operator's special signaling connections with the telephone equipment have given the operator the signaling control required to perform these functions.

While this arrangement has been suitable in the past, it has become particularly disadvantageous in today's telephony world. First, the telephone network itself has become vastly more complicated. As computer systems have been integrated into the network, calling parties have found themselves entering digits to navigate through menus, traverse private branch exchanges ("PBXs"), place their own international calls or access new services, such as electronic banking by phone or voice mailboxes. Today's telephone calls often resemble a computer session more than they do a person-to-person conversation.

Second, it is becoming apparent that large, centralized attendant centers staffed with banks of attendants are expensive to operate. Of course, such centers have been necessary in the past, because they required special signaling connections with, and therefore proximity to, the telephone equipment. However, it would be advantageous to provide the same or better level of customer service by means of a more economical alternative.

Third, some parties are more experienced, better located or better equipped than others to perform signaling functions. For instance, a calling party may wish to participate in, and pay for, a conference call, but has no idea how to generate the control signals to establish one. Apart from enlisting an attendant (at some cost), the calling party currently has no alternative but to muddle through the conferencing procedure personally.

Accordingly, what is needed in the art is a way of eliminating the need for the special signaling connections that are currently required to allow a party other than the calling party to control the signaling for the calling party's call.

SUMMARY OF THE INVENTION

If such signaling could be performed over an ordinary voice channel, today's centralized "attendant centers" could then become virtual, with the attendants being geographically distributed, perhaps even performing their jobs from their homes. Further, parties other than operators could control signaling and thereby "step into the shoes" of calling parties, allowing more capable, better located or better equipped parties to control signaling for calls they themselves did not originate.

To address this objective and therefore overcome the above-discussed deficiencies of the prior art, the present invention provides, in a telecommunication system having a network switch capable of independently controlling inbound and outbound call legs, a system for, and method of, redirecting in-band control of signaling pertaining to a call placed by a calling party and a system for providing automatic call completion from the calling party to a called party.

The control redirecting system includes: (1) call control circuitry, associated with the network switch, for routing the call from the calling party to another party through the network switch, the call thereby having an inbound leg from the calling party to the network switch and an outbound leg from the network switch to the other party and (2) call control redirection circuitry for treating the outbound leg of the call as a second inbound leg from the other party to the network switch and monitoring in-band control signals received from the other party via the second inbound leg, the call control redirection circuitry thereby allowing the other party to issue the in-band control signals to the call control circuitry.

The present invention therefore introduces the broad concept of allowing a party other than the calling party to issue in-band control signals or commands to the call control circuitry. This allows the other party to "step into the shoes" of the calling party with respect to signaling via a simple voice channel (the second inbound leg). Since the present invention allows redirection of control via a voice channel, the other party needs no special connection with, or proximity to, the network switch.

For purposes of the present invention, "in-band" is defined as being within a voice channel (carried over, for example, an analog household telephone line, or such as an Integrated Services Digital Network ("ISDN")B-channel), as opposed to a signaling or control channel (such as an ISDN D-channel or a Signaling System 7 ("SS7") channel). In other words, -in-band control signals traverse the same channel (or "band")as the substantive voice, video or computer data exchanged between the calling and other parties.

In one embodiment, the present invention allows the other party to take control over signaling upon the issuance of a particular control signal. For purposes of the present invention, "signaling" is broadly defined to include any signaling, call processing, call progress or call control function.

In one embodiment of the present invention, the other party is a party other than a called party, the system allowing the other party to complete a call from the calling party to the called party. In a more specific embodiment to be described hereinafter, the present invention enables automatic call completion, whereby an operator (or attendant) may assume control over the signaling functions of a calling party's call. Automatic call completion allows the attendant to complete the calling party's call without requiring the calling party to exert control over the signaling. Alternatively, the other party is the called party itself, the system allowing the called party to issue the in-band control signals to the call control circuitry.

In one embodiment of the present invention, the system further comprises a voice response unit ("VRU"), associated with the call control circuitry, for receiving in-band voice commands issued from the other party. Alternatively or additionally, the in-band control signals are dual-tone multifrequency ("DTMF")commands. In-band signaling of any type, however, is within the scope of the present invention.

In one embodiment of the present invention, the call control circuitry places the calling party on hold while the other party issues the in-band control signals to the network switch. By placing the calling party on hold, this embodiment frees the calling party from having to hear any in-band signaling. Furthermore, the network switch is caused to ignore any spurious in-band control signals that the calling party may generate. Control is thereby vested solely in the other party.

In one embodiment of the present invention, the call control circuitry allows the calling party to monitor the outbound leg while the other party issues the in-band control signals to the network switch. In this embodiment, the calling party can hear the in-band control signals and, more specifically, the progress of the call. As in the previous embodiment, the network switch may be caused to ignore any spurious in-band control signals that the calling party may generate.

In one embodiment of the present invention, the call control circuitry drops the other party from the call after the other party issues the in-band control signals to the network switch. In this manner, the other party may interject in-band control signals for a period of time, and then be dropped from the call. Dropping may occur upon the other party's issuance of a particular control signal.

The foregoing has outlined, rather broadly, alternative embodiments and features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4 illustrates a method for redirecting control of in-band signaling according to the principles of the present invention;

FIG. 6 illustrates a representative method of completing a call according to the principles of the present invention.

DETAILED DESCRIPTION

Figure 1:
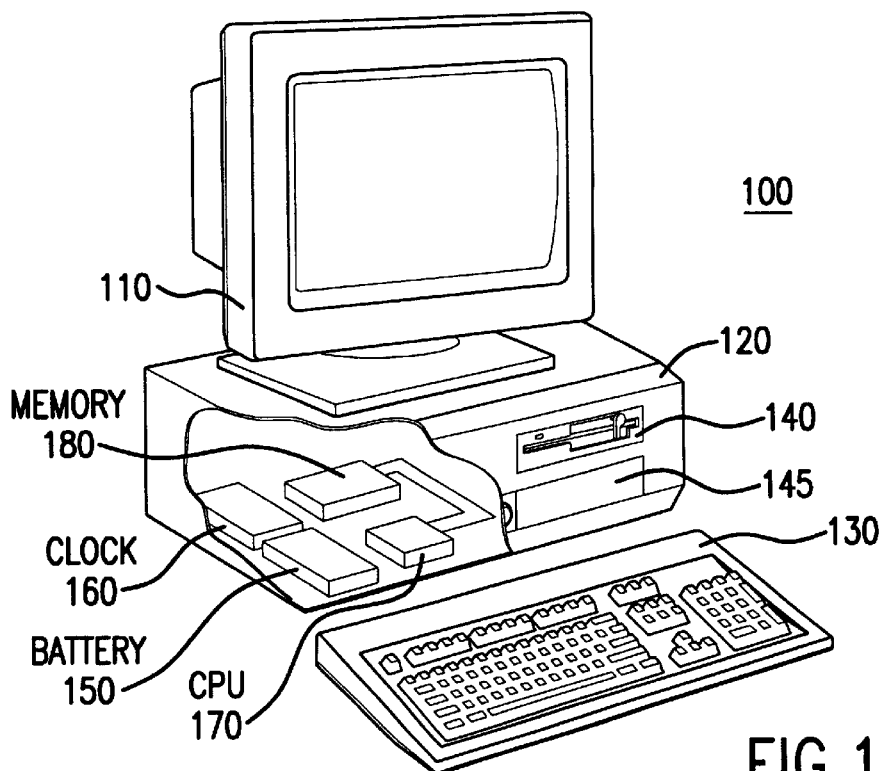
FIG. 1 illustrates an isometric view of a computer system that provides an environment within which the present invention can operate.

Referring initially to FIG. 1, illustrated is an isometric view of a computer system 100 that provides an environment within which the present invention can operate. Since the present invention is not limited to application in a computer environment, however, FIG. 1 is presented for illustrative purposes only.

The computer system 100 includes a monitor 110, a chassis 120 and a keyboard 130. The monitor 110 and the keyboard 130 cooperate to allow communication between the computer system 100 and a user. Alternatively, the monitor 110 and keyboard 130 may be replaced by other conventional output input devices, respectively. The chassis 120 includes both a floppy disk drive 140 and hard disk drive 145. The floppy disk drive 140 is employed to receive, read and write to removable disks; the hard disk drive 145 is employed for fast access storage and retrieval, typically to a nonremovable disk. The floppy disk drive 140 may be replaced by or combined with other conventional structures to receive and transmit data and instructions, including without limitation, tape and compact disc drives, telephony systems and devices (including videophone, paging and facsimile technologies), and serial and parallel ports.

The chassis 120 is illustrated having a cut-away portion that includes a battery 150, clock 160, central processing unit ("CPU") 170 and memory storage device 180. The call control circuitry, call control redirection circuitry and call placement circuitry of the present invention are, in the illustrated embodiments, formed by a cooperation of the CPU 170, the memory storage device 180 and a sequence of executable instructions, storable in the memory storage device 180 and executable in the CPU 170 to perform as specified. Although the computer system 100 is illustrated having a single CPU 170, hard disk drive 145 and memory storage device 180, the computer system 100 may be equipped with a plurality of CPUs and peripheral devices.

It should be noted that any conventional computer system having at least one CPU that is suitable to function at a network switch or attendant center system may be replaced, or be used in conjunction with, the computer system 100, including without limitation: videophones, telephones, televisions, sophisticated calculators, and hand-held, laptop/notebook, mini, mainframe and supercomputers, including RISC and parallel processing architectures, as well as within computer system/network combinations. Conventional computer system architecture is more fully discussed in Computer Organization and Architecture, by William Stallings, MacMillan Publishing Co. (3rd ed. 1993), incorporated herein by reference. Alternative computer system embodiments may be firmware-or hardware-based.

Figure 2:
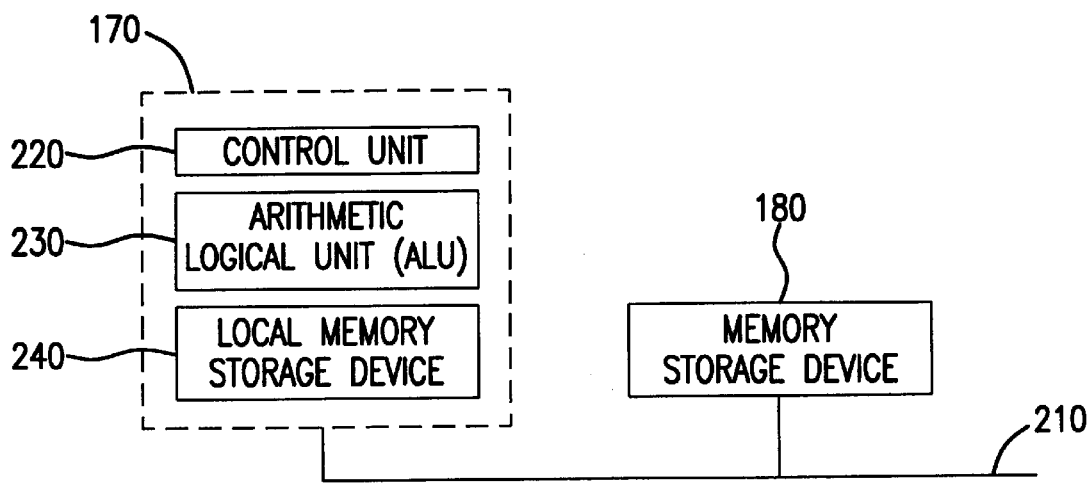
FIG. 2 illustrates a schematic block diagram of the central processing unit ("CPU")of FIG. 1.

Turning now to FIG. 2, illustrated is a schematic block diagram of the CPU 170 of FIG. 1. The CPU 170 is coupled to the memory storage device 180 by a data bus 210. The memory storage device 180 stores data and instructions that the CPU 170 uses to execute the functions necessary to operate the computer system 100. The memory storage device 180 may be any conventional memory storage device. The CPU 170 includes a control unit 220, arithmetic logic unit ("ALU") 230 and local memory storage device 240 (e.g. stackable cache or a plurality of registers). The control unit 220 fetches the instructions from memory storage device 180. The ALU 230, in turn, performs a plurality of operations, including addition and Boolean AND, necessary to carry out the instructions fetched from the memory storage device 180. The local memory storage device 240 provides a local high speed storage location for storing temporary results and control information generated and employed by the ALU 230. Again, the call control circuitry or call placement circuitry of the present invention is embodied in the CPU 170 in combination with the memory storage device 180.

Figure 3:
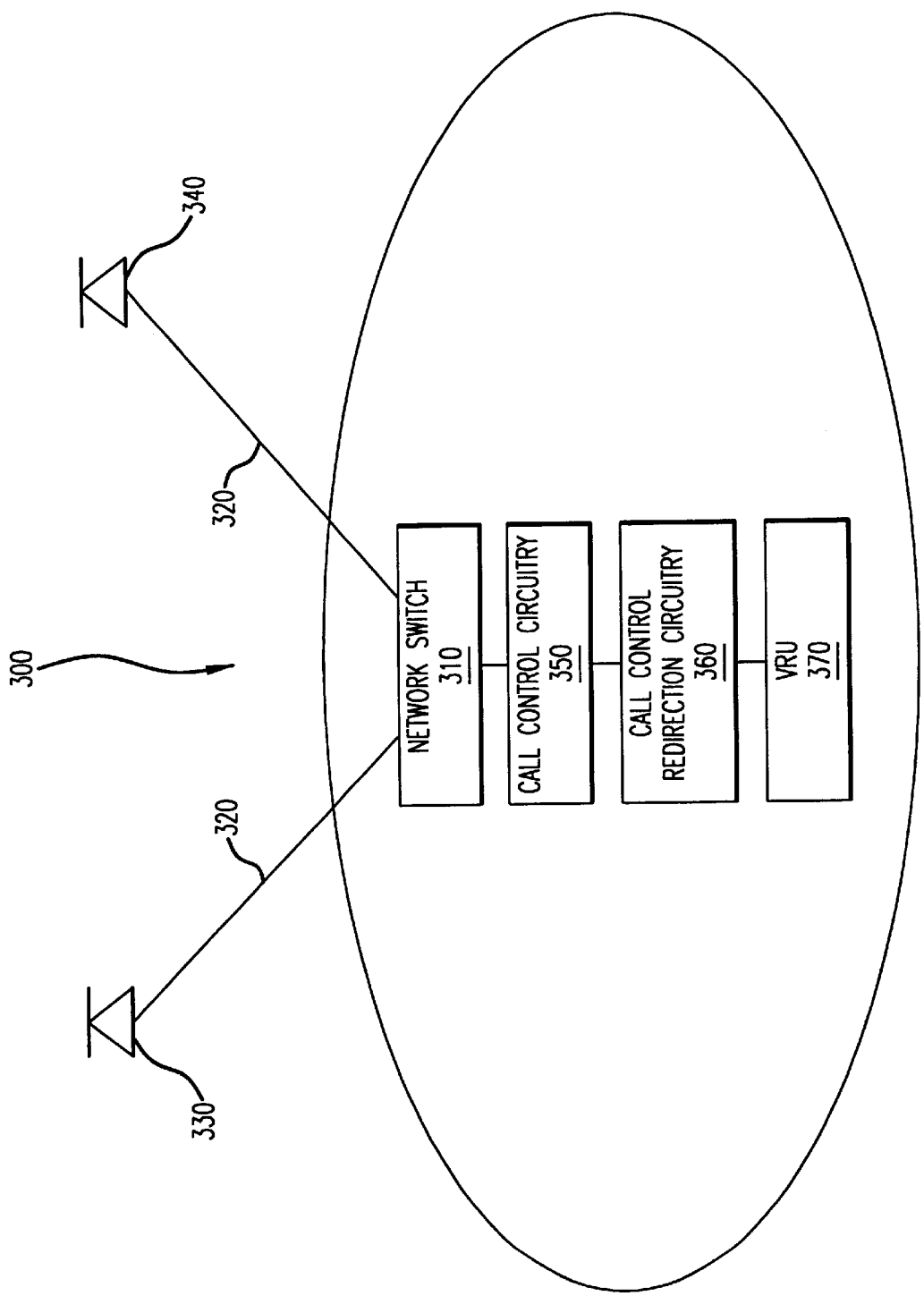
FIG. 3 illustrates a telecommunication system employing an embodiment of a system for redirecting control of in-band signaling according to the principles of the present invention.

Turning now to FIG. 3, illustrated is a telecommunication system (e.g., the public telephone network) employing an embodiment of a system for redirecting control of in-band signaling according to the principles of the present invention. The system, designated 300, comprises a conventional network switch 310 coupled to a plurality of conventional telephone lines 320. The plurality of telephone lines 320 are coupled to a plurality of endpoints or, more generally, nodes (only two of which are shown) within the system 300, allowing the network switch 310 to provide circuit switching among the plurality of endpoints or nodes. First and second endpoints 330, 340 are illustrated and happen to be, for the purposes of the present discussion, telephone instruments. Also for purposes of the present discussion, the first endpoint 330 is associated with a calling party (not shown) and the second endpoint 340 is associated with another party (again, not shown).

Call control circuitry 350 is coupled to, and controls, the network switch 310. In the illustrated embodiment, the network switch 310 is processor-controlled; the call control circuitry 350 therefore takes the form of a sequence of computer-executable instructions executed in the, processor of a general purpose computer (such as the computer system 100 of FIG. 1) to cause the conventional network switch 310 operate in a novel manner according to the present invention. Of course, the call control circuitry (and the call control redirection circuitry and call placement circuitry, for that matter) may take the form of hard-wired digital or analog circuitry, as appropriate.

During its normal operation, the network switch 310 couples "inbound" legs (telephone lines coupled to endpoints belonging to calling parties) to "outbound" legs (telephone lines coupled to endpoints belonging to called parties). In this manner, calling and called parties are linked together for point-to-point communication of the parties' substantive voice, video or computer data. Normally, inbound and outbound legs are carried on a single physical channel within the network switch 310 or on two inseparably linked physical channels.

However, in some conventional network switches, particularly processor-controlled switches such as the commercially-available DEFINITY" switch manufactured by AT&T, it is possible to separate the inbound and outbound legs of a given call and control each leg independently. Although it has always been known that conventional network switches may be modified to separate the individual legs of a given call, there has been no motivation to modify a network switch to separate the legs, until now. In fact, under normal circumstances, it would be disadvantageous to separate the legs of a call, since such might disconnect the call.

Separation of the call legs, however, is important to the present invention, as it allows the call control circuitry 350 to treat the outbound leg of a given call as a second inbound leg without disturbing the original inbound leg. This gives the party corresponding to the newly-designated second inbound leg complete control over signaling functions that would have previously only been vested in the calling party via the original inbound leg.

Accordingly, FIG. 3 shows call control redirection circuitry 360, coupled to the call control circuitry 350 and the network switch 310. The call control redirection circuitry 360 is capable of monitoring calls passing through the network switch 310 for particular redirection-enabling control signals. The nature of these and other signals will be described in detail hereinafter.

FIG. 3 further shows an optional VRU 370. The VRU 370 is coupled to the call control circuitry 350 and is capable of intercepting voice commands from calls passing through the network switch 310. It should be understood that the VRU 370 is shown for completeness and is not necessary to the present invention. In the absence of a VRU 370, DTMF or other in-band signals may still be used to effect signaling control. It should also be understood that the system 300 may further comprise other, perhaps intermediate, nodes, such as routers. The presence or absence of such other nodes would not affect the operation of the present invention and are therefore omitted from FIG. 3 for clarity's sake.

The operation of the system 300 to effect redirection of control of in-band signaling will now be described. Turning now to FIG. 4, illustrated is a method for redirecting control of in-band signaling according to the principles of the present invention. The method begins with a start step 400, wherein a calling party has made a call with the first endpoint 330 through the network switch 310 and under control of the call control circuitry 350. The calling party may have intentionally placed the call to the other party at the second endpoint 340. Alternatively, the calling party may have attempted, unsuccessfully, to place the call to an unnamed called party at a third endpoint (not shown) and have been routed automatically by the network switch 310 to the other party at the second endpoint 340. Alternatively, the network switch 310 may have routed the call automatically to the other party, even though the calling party properly placed the call to the unnamed called party (perhaps if the call is international). In either case, the network switch 310 routes the call to the other party at the second endpoint 340. At this point in the call, the calling party has complete control of signaling functions.

In a monitor call step 410, the call control redirection circuitry 360 monitors the call for particular in-band control signals that are to activate redirection of call control. For purposes of the present discussion, it will be assumed that the particular in-band control signal is a DTMF tone corresponding to "#",a key found on conventional telephone key pads. (If a VRU 370 is present, the activating in-band control signal could be a spoken word or series of words.) If the call control redirection circuitry 360 detects the "#" DTMF tone, the call redirection circuitry 360 directs the network switch 310 to separate the inbound leg (from the first endpoint 330 associated with the calling party) from the outbound leg (to the second endpoint 340 associated with the other party) in a step 420.

Once separated, the call control redirection circuitry 360 directs the call control circuitry to treat the outbound leg as a second inbound leg in a step 430, preferably without affecting the original inbound leg in any way. The call control redirection circuitry 360 may optionally place the original inbound leg on hold (to free the calling party from having to hear the subsequent in-band signaling) or may allow the original inbound leg to continue to monitor the in-band signaling. In either case, it is advantageous that the call control redirection circuitry 360 direct the network switch 310 to ignore any spurious in-band control signals that the calling party may thereafter inadvertently or intentionally generate. By ignoring any such control signals, the network switch 310 is prevented from being confused or misdirected by virtue of being under control of more than one party at a time.

In a step 440, the call control circuitry 350 begins to accept and perform according to in-band control signals from the other party via the second endpoint 340. Again, the in-band control signals may take the form of voice commands routed through the VRU 370 or may take the form of DTMF tones. The other party may direct the call control circuitry 360 to perform any function that the calling party could have commanded. The other party, if properly authorized, may even have access to functions not available to the calling party (e.g., functions that would only be proper to make available to an operator). Such might be desirable if, for instance, the other party is an attendant and is performing fee-based services on behalf of the calling party.

The present invention can further allow the other party to redirect billing for the call. This is particularly desirable if, again, the other party is an attendant. Through the use of in-band control signals, the other party can select whether the calling party, a called party, the other party or some third party (such as a corporate account) is ultimately billed for the call (or, for that matter, the fee-based services).

In a step 450, it is assumed that the other party wishes to relinquish control of the call. Preferably, the other party relinquishes control by issuing another particular terminating control signal (perhaps a DTMF tone corresponding to a "*") to the call control redirection circuitry 360. When the call control redirection circuitry 360 receives such control signal, the call control redirection circuitry 360 may direct the network switch 310 to reconnect the original inbound and outbound legs to restore the call between the calling and other parties. (In this example, the network switch 310 has redesignated the outbound leg a total of two times.) Alternatively, the call control redirection circuitry 360 may direct the network switch 310 to connect the inbound leg with another outbound leg that the other party may have created while interacting with the call control circuitry 350. This is particularly appropriate in automatic call completion, wherein the other party (often an attendant) may place a second call (on behalf of the calling party) to a called party and may, through the call control redirection circuitry 360, cause the inbound leg of the first call from the calling party to be joined to the outbound leg of the second call to the called party. Automatic call completion will be described most particularly with respect to FIGS. 5 and 6.

Having relinquished control, the call control redirection circuitry 360 may, under some circumstances, drop the other party from the call. The method then ends in an end step 460.

Figure 5:
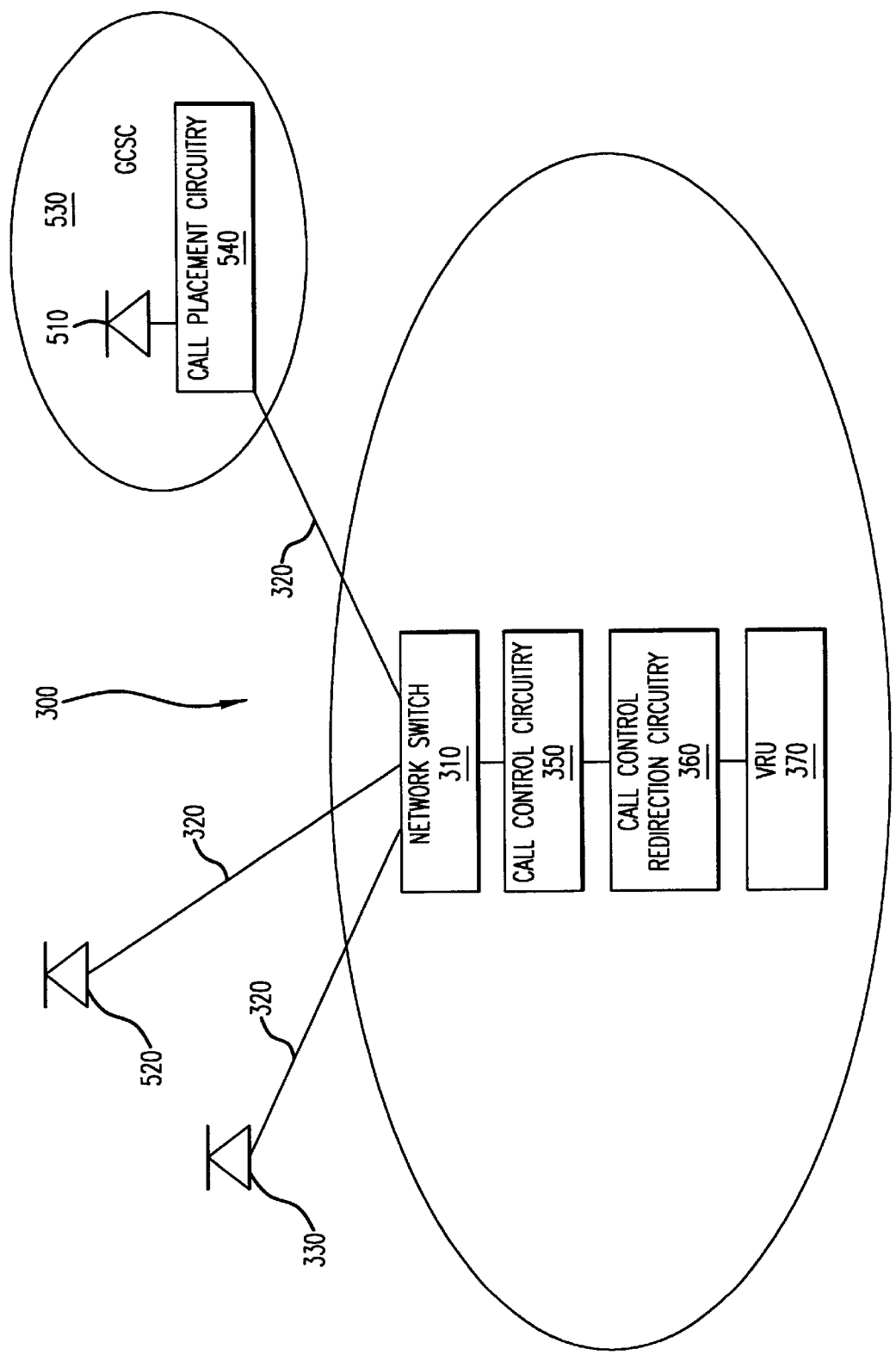
FIG. 5 illustrates a telecommunication system employing an embodiment of a call completion system according to the principles of the present invention.

Turning now to FIG. 5, illustrated is the telecommunication system 300 employing an embodiment of a call completion system according to the principles of the present invention. Automatic call completion via a directory assistance service is a well-known feature that telephone companies currently offer. The directory assistance service typically enables a calling party to request and obtain automatic completion of a call to a called party at a DTN by simply pressing a button on a touchtone telephone. In response, the directory assistance service directs the telecommunication system to which it is directly linked to dial the DTN and thereby complete the call automatically.

Because the calling party is not directly involved in completing the call, automatic call completion frees the calling party from the need to memorize or write down the DTN (required in manual call completion) and results in a substantially faster connection to the called party than manual call completion. As previously described, one of the applications of the present invention is to effect automatic call completion, wherein a more experienced, better located or better equipped attendant (or other party) may complete a call on behalf of a calling party (1) without requiring the calling party to intervene and (2) without requiring a special signaling path between the attendant (or other party) and the network switch.

Returning to FIG. 5, the telecommunication system 300 includes the network switch 310 coupled to the plurality of conventional telephone lines-320. The plurality of conventional telephone lines 320 are coupled to the plurality of endpoints, allowing the network switch 310 to provide circuit switching among the plurality of endpoints. The first endpoint 330 and a third endpoint 520 are illustrated and happen to be, for the purposes of the present discussion, telephone instruments. Also for purposes of this discussion, the first endpoint 330 is associated with a calling party (not shown) and the third endpoint 520 is associated with a called party (again, not shown). The telecommunication system 300 also includes an attendant center system or global customer services center ("GCSC") 530 coupled to the network switch 310 via a second endpoint 510 and having call placement circuitry 540 associated therewith. The call placement circuitry 540 generates in-band DTN data control signals to direct the call control circuitry 350 to place calls through the telecommunication network 300. The call placement circuitry 540 may simply receive and forward DTMF codes or voice commands from an attendant and may actually form a portion of the second endpoint 510 or may be an automated operator capable of completing calls and therefore a separate piece of equipment (as shown)

Again, the call control circuitry 350 is coupled to, and controls, the network switch 310. Again, during its normal operation, the network switch 310 couples "inbound" legs (telephone lines coupled to endpoints belonging to calling parties) to "outbound" legs (telephone lines coupled to endpoints belonging to called parties).

The call control redirection circuitry 360 is again illustrated as being coupled to the call control circuitry 350 and the network switch 310. As in FIG. 3, the call control redirection circuitry 360 is capable of monitoring calls passing through the network switch 310 for particular redirection-enabling control signals. FIG. 5 further shows the optional VRU 370. The VRU 370 is coupled to the call control circuitry 350 and is capable of intercepting voice commands from calls passing through the network switch 310. As in FIG. 3, it should be understood that the VRU 370 is shown for completeness and is not necessary to the present invention. In the absence of a VRU 370, DTMF or other in-band signals may still be used to effect signaling control. The operation of the system 300 to effect redirection of control of in-band signaling will now be described.

Turning now to FIG. 6, illustrated is a representative method of completing a call according to the principles of the present invention. The method begins with a start step 600, wherein a calling party has made a call via the first endpoint 330 through the network switch 310 and under control of the call control circuitry 350. Whether the calling party has intended so or not, the network switch 310 routes the call to the GCSC 530 at the second endpoint 510. At this point in the call, the calling party has complete control of signaling functions.

In a monitor call step 610, the call control redirection circuitry 360 monitors the call for particular in-band control signals that are to activate redirection of call control. Again, for purposes of the present discussion, it will be assumed that the particular in-band control signal is a DTMF tone corresponding to "#", a key found on conventional telephone key pads. (If the VRU 370 is present, the activating in-band control signal could be a spoken word or series of words.) If the call control redirection circuitry 360 detects the "#" DTMF tone, the call redirection circuitry 360 directs the network switch 310 to separate the inbound leg (from the first endpoint 330 associated with the calling party) from the outbound leg (to the second endpoint 510 associated with the GCSC 530) in a step 620.

Once separated, the call control redirection circuitry 360 directs the call control circuitry to treat the outbound leg as a second inbound leg in a step 630, preferably without affecting the original inbound leg in any way. The call control redirection circuitry 360 may optionally place the original inbound leg on hold (to free the calling party from having to hear the subsequent in-band signaling) or may allow the original inbound leg to continue to monitor the in-band signaling. In either case, it is advantageous that the call control redirection circuitry 360 direct the network switch 310 to ignore any spurious in-band control signals that the calling party may thereafter inadvertently or intentionally generate. By ignoring any such control signals, the network switch 310 is prevented from being confused or misdirected by virtue of being under control of more than one party at a time.

In a step 640, the call control circuitry 350 begins to accept and perform according to in-band control signals from the call placement circuitry 540 at the GCSC 530 via the second endpoint 510. Again, the in-band control signals may take the form of voice commands routed through the VRU 370 or may take the form of DTMF tones. The GCSC 530 may direct the call control circuitry 360 to complete the call to the called party via the third endpoint 520 according to the calling party's instructions.

In a step 650, it is assumed that, after completing the call, the GCSC 530 wishes to relinquish control of the call. Preferably, the GCSC 530 relinquishes control by issuing another particular terminating control signal (perhaps a DTMF tone corresponding to a "*") to the call control redirection circuitry 360. When the call control redirection circuitry 360 receives such a control signal, the call control redirection circuitry 360 directs the network switch 310 to connect the inbound leg with the outbound leg that the GCSC 530 created when completing the call on behalf of the calling party.

Having relinquished control, the call control redirection circuitry 360 advantageously drops the GCSC 530 from the call. The method then ends in an end step 660. Either the calling party or the called party may terminate the call after the GCSC 530 is dropped therefrom.

Although the present invention has been described in detail, those skilled in the art should understand that they can make various changes, substitutions and alterations herein without departing from the spirit and scope of the invention in its broadest form.

What is claimed is:

1. In a telecommunication system having a network switch capable of independently controlling inbound and outbound call legs, a system for redirecting in-band control of signaling pertaining to a call placed by a calling party, comprising:

call control circuitry, associated with said network switch, for routing a first call from said calling party to another party through said network switch, said call thereby having an inbound leg from said calling party to said network switch and an outbound leg from said network switch to said other party;

call control redirection circuitry for treating said outbound leg of said first call as a second inbound leg from said other party to said network switch and monitoring in-band control signals received from said other party via said second inbound leg, said call control redirection circuitry thereby allowing said other party to issue said in-band control signals to said call control circuitry; and wherein said other party is a party other than a called party, said system allowing said other party to complete a call from said calling party to said called party.

2. The system as recited in claim 1 further comprising a voice response unit (VRU), associated with said call control circuitry, for receiving in-band voice commands issued from said other party.

3. The system as recited in claim 1 wherein said in-band control signals are dual-tone multifrequency (DTMF) commands.

4. The system as recited in claim 1 wherein said call control circuitry places said calling party on hold while said other party issues said in-band control signals to said network switch.

5. The system as recited in claim 1 wherein said call control circuitry allows said calling party to monitor said outbound leg while said other party issues said in-band control signals to said network switch.

6. The system as recited in claim 1 wherein said call control circuitry drops said other party from said call after said other party issues said in-band control signals to said network switch.

7. In a telecommunication system having a network switch capable of independently controlling inbound and outbound call legs, a method of redirecting in-band control of signaling pertaining to a call placed by a calling party, comprising:

routing said call from said calling party to another party through said network switch, said call thereby having an inbound leg from said calling party to said network switching and outbound leg from said network switch to said other party;

treating said outbound leg of said call as a second inbound leg from said other party to said network switch; monitoring in-band control signals received from said other party via said second inbound leg, thereby allowing said other party to issue said in-band control signals to said network switch; and wherein said other party is a party other than a called party, said method allowing said other party to complete a call from said calling party to said called party.

8. The method as recited in claim wherein said monitoring includes receiving in-band voice commands issued from said other party.

9. The method as recited in claim 7 wherein said in-band control signals are dual-tone multifrequency (DTMF) commands.

10. The method as recited in claim 7 further comprising the step of placing said calling party on hold while said other party issues said in-band control signals to said network switch.

11. The method as recited in claim 7 further comprising the step of allowing said calling party to monitor said outbound leg while said other party issues said in-band control signals to said network switch.

12. The method as recited in claim 7 further comprising the step of dropping said other party from said call after said other party issues said in-band control signals to said network switch.

13. In a telecommunication system having a processor-controlled network switch capable of separating inbound and outbound call legs and an attendant center system coupled thereto, a call completion system for providing automatic call completion from a calling party to a called party, comprising:

call control circuitry, associated with said network switch, for routing a first call from said calling party to said attendant center system through said network switch and monitoring in-band control signals received from said attendant center system; and call placement circuitry, associated with said attendant center system, for generating in-band destination number data control signals and to direct said call control circuitry to place a second call to said called party through said telecommunication system, said call control circuitry subsequently merging said first and second calls to couple said calling party to said called party through said telecommunication system, said call control circuitry placing said second call.

14. The call completion system as recited in claim 13 further comprising a voice response unit (VRU), associated with said call control circuitry, for receiving in-band voice commands issued via said attendant center system.

15. The call completion system as recited in claim 13 wherein said call control circuitry places said first call on hold while said call control circuitry places said second call to said called party through said network switch.

16. The call completion system as recited in claim 13 wherein said call control circuitry allows said calling party to monitor an inbound call leg of said first call while said call control circuitry places said second call to said called party through said network switch.

17. The call completion system as recited in claim 13 wherein said attendant center system transmits said control signals to said call control circuitry via an outbound call leg of said First call.

18. The call completion system as recited in claim 13 wherein said call control circuitry drops said attendant center system from said first call after said call control circuitry merges said first and second calls to couple said calling party to said called party through said network switch.

19. The call completion system as recited in claim 13 wherein said call control circuitry places said second call to said called party through said network switch.

20. In a telecommunication system having a network switch capable of independently controlling inbound and outbound call legs, a system for redirecting in-band control of signaling pertaining to a call placed by a calling party, comprising:

call control circuitry, associated with said network switch, for routing a first call from said calling party to another party through said network switch, said call thereby having an inbound leg from said calling party to said network switch and an outbound leg from said network switch to said other party;

call control redirection circuitry for treating said outbound leg of said first call as a second inbound leg from said other party to said network switch and monitoring in-band control signals received from said other party via said second inbound leg, said call control redirection circuitry thereby allowing said other party to issue said in-band control signals to said call control circuitry; and wherein said call control circuitry allows said calling party to monitor said outbound leg while said other party issues said in-band control signals to said network switch.

21. In a telecommunication system having a network switch capable of independently controlling inbound and outbound call legs, a method of redirecting in-band control of signaling pertaining to a call placed by a calling party, comprising:

routing said call from said calling party to another party through said network switch, said call thereby having an inbound leg from said calling party to said network switching and outbound leg from said network switch to said other party;

treating said outbound leg of said call as a second inbound leg from said other party to said network switch;

monitoring in-band control signals received from said other party via said second inbound leg, thereby allowing said other party to issue said in-band control signals to said network switch; and allowing said calling party to monitor said outbound leg while said other party issues said in-band control signals to said network switch.

* * * * *